(12) United States Patent
Husemann et al.

(10) Patent No.: US 8,945,717 B2
(45) Date of Patent: Feb. 3, 2015

(54) ADHESIVE MATERIAL

(75) Inventors: Marc Husemann, Hamburg (DE); Stephan Zollner, Buchholz/Nordheide (DE)

(73) Assignee: tesa SE, Hamburg (DE)

( * ) Notice: Subject to any disclaimer, the term of this patent is extended or adjusted under 35 U.S.C. 154(b) by 2355 days.

(21) Appl. No.: 10/581,192

(22) PCT Filed: Nov. 16, 2004

(86) PCT No.: PCT/EP2004/052971
§ 371 (c)(1),
(2), (4) Date: Mar. 5, 2007

(87) PCT Pub. No.: WO2005/054389
PCT Pub. Date: Jun. 16, 2005

(65) Prior Publication Data
US 2007/0172684 A1   Jul. 26, 2007

(30) Foreign Application Priority Data
Dec. 5, 2003   (DE) .................. 103 57 323

(51) Int. Cl.
*B32B 27/34* (2006.01)
*B32B 27/36* (2006.01)
*C09J 7/00* (2006.01)
*C09J 133/04* (2006.01)

(52) U.S. Cl.
CPC *C09J 7/00* (2013.01); *C09J 133/04* (2013.01); *C09J 2201/128* (2013.01); *C09J 2201/606* (2013.01); *C09J 2201/61* (2013.01); *C09J 2433/00* (2013.01)

USPC ............ 428/522; 428/423.1; 428/424.2; 428/480; 428/515

(58) Field of Classification Search
USPC ........................................ 428/355
See application file for complete search history.

(56) References Cited

U.S. PATENT DOCUMENTS

| 3,326,741 A | 6/1967 | Olson |
| 3,639,500 A | 2/1972 | Muny et al. |
| 4,199,646 A | 4/1980 | Hori et al. |

(Continued)

FOREIGN PATENT DOCUMENTS

| DE | 36 10 487 | 10/1986 |
| DE | 199 49 352 | 4/2000 |

(Continued)

OTHER PUBLICATIONS

T.G. Fox, Bull. Am. Phys. Soc. 1 (1956) 123.

(Continued)

*Primary Examiner* — John J Figueroa
(74) *Attorney, Agent, or Firm* — Norris McLaughlin & Marcus PA

(57) ABSTRACT

The invention relates to a pressure-sensitive adhesive. It is envisaged that the pressure-sensitive adhesive comprises a first layer and a second layer,
the first layer being a heat-activatable pressure-sensitive adhesive which has a static glass transition temperature $T_{g,a}$ or a melting point $T_{m,a}$ of at least +30° C.; and
the second layer being a polyacrylate pressure-sensitive adhesive which has a static glass transition temperature of not more than +15° C.

13 Claims, 1 Drawing Sheet

(56) References Cited

U.S. PATENT DOCUMENTS

| | | | |
|---|---|---|---|
| 4,248,748 | A | 2/1981 | McGrath et al. |
| 4,339,485 | A | 7/1982 | Shibano et al. |
| 4,404,246 | A | 9/1983 | Charbonneau et al. |
| 4,404,345 | A | 9/1983 | Janssen |
| 4,452,955 | A | 6/1984 | Boeder |
| 4,545,843 | A | 10/1985 | Bray |
| 4,581,429 | A | 4/1986 | Solomon et al. |
| 4,880,683 | A | 11/1989 | Stow |
| 5,077,353 | A * | 12/1991 | Culbertson ................ 525/446 |
| 5,540,989 | A | 7/1996 | Maul et al. |
| 5,589,122 | A | 12/1996 | Leonard et al. |
| 5,593,759 | A | 1/1997 | Vargas et al. |
| 5,608,023 | A | 3/1997 | Odell et al. |
| 5,660,922 | A | 8/1997 | Herridge et al. |
| 5,767,210 | A | 6/1998 | Lecomte et al. |
| 5,789,487 | A | 8/1998 | Matyjaszewski et al. |
| 5,811,500 | A | 9/1998 | Dubois et al. |
| 5,854,364 | A | 12/1998 | Senninger et al. |
| 5,919,871 | A | 7/1999 | Nicol et al. |
| 5,945,491 | A | 8/1999 | Matyjaszewski et al. |
| 6,114,482 | A | 9/2000 | Senninger et al. |
| 6,281,311 | B1 | 8/2001 | Lai et al. |
| 6,479,608 | B1 | 11/2002 | Nesvadba et al. |
| 6,642,318 | B1 | 11/2003 | Chiefari et al. |
| 6,958,186 | B2 * | 10/2005 | Husemann et al. ........... 428/346 |
| 2004/0171777 | A1 | 9/2004 | Le et al. |
| 2005/0263243 | A1 | 12/2005 | Schumann et al. |

FOREIGN PATENT DOCUMENTS

| | | |
|---|---|---|
| DE | 199 51 902 | 10/2002 |
| DE | 101 53 677 | 5/2003 |
| EP | 0 735 052 | 10/1995 |
| EP | 0 824 110 | 2/1998 |
| EP | 0 824 111 | 2/1998 |
| EP | 0 826 698 | 3/1998 |
| EP | 0 841 346 | 5/1998 |
| EP | 0 850 957 | 7/1998 |
| EP | 1308492 A2 * | 5/2003 |
| NL | 92 01 680 | 4/1994 |
| WO | WO 93/07228 | 4/1993 |
| WO | WO 96/24620 | 8/1996 |
| WO | WO 98/01478 | 1/1998 |
| WO | WO 98/13392 | 4/1998 |
| WO | WO 98/44008 | 10/1998 |
| WO | WO 99/31144 | 6/1999 |

OTHER PUBLICATIONS

Macromolecules, 1995, 28, 7886.

Macromolecules 2000, 33, 243-245.

Fouassier: "Photoinitiation, Photopolymerization and Photocuring: Fundamentals and Applications", Hanser-Verlag, Munich 1995.

Carroy et al. "Chemistry and Technology of UV and EB Formulation for Coatings, Inks and Paints", Oldring (ed.), 1994, SITA, London.

* cited by examiner

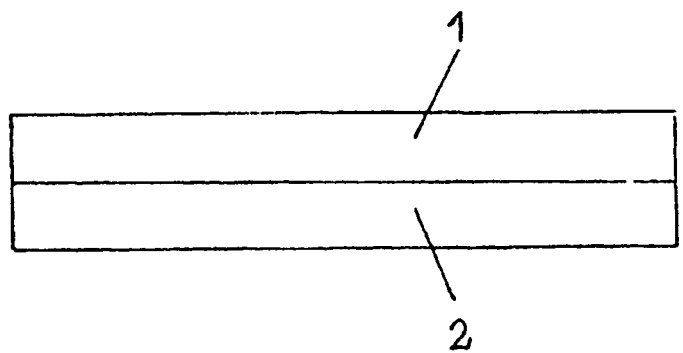

ADHESIVE MATERIAL

This is a 371 of PCT/EP2004/052971 filed 16 Nov. 2004 (international filing date).

The invention relates to a pressure-sensitive adhesive, to processes for preparing it, and to a use for a pressure-sensitive adhesive of this kind.

BACKGROUND OF THE INVENTION

For industrial pressure-sensitive adhesive (PSA) tape applications it is very common to use double-sided pressure-sensitive adhesive tapes in order to bond two materials to one another. For the very wide variety of applications the requirements are in some cases highly specific, with the consequence that stringent requirements are imposed on the corresponding adhesive tapes. In the automobile segment, for example, the requirements very often include high temperature stability and a high level of resistance to solvents and fuels. These properties are met in a very good form by crosslinked acrylate PSAs.

Furthermore, again in the industrial segment, a very wide variety of substrates may be bonded. In this case it may sometimes be of advantage to use heat-activatable adhesives, which above a certain temperature undergo softening, flow very well onto the substrates, and then cool to give a firm bond.

Double-sided PSA tapes which meet different requirements of this kind are already well established.

U.S. Pat. No. 5,593,759 describes a double-sided PSA tape which is composed of a carrier layer coated with two thin PSAs. The carrier layer is composed of a structural adhesive. On thermal activation, the PSA blends with the structural PSA and also cures it. In this way, very firm bonds between two adherends are possible. Nevertheless, this PSA tape has an elementary disadvantage for many applications, namely the fact that the double-sided PSA tape is already tacky on both sides to begin with. There exist a large number of applications in which it is advantageous if the PSA tape is non-tacky, at least on one side, and hence possesses optimum repositionability. In U.S. Pat. No. 5,593,759 this advantage is absent.

U.S. Pat. No. 4,248,748 describes heat-activatable polyacrylate PSAs with additions of resin. The additions of resin raise the glass transition temperature of the polyacrylate PSA and hence the tack at room temperature. The heat-activatable PSAs, however, are used only for single-sided PSA tapes (film bonding, etc.). Accordingly, the requirements concerning the bonding of adherends or the anchoring of heat-activatable PSAs to the film are not high.

U.S. Pat. No. 4,199,646 describes heat-activatable PSA tapes where the heat-activatable PSA has an elasticity modulus of 10 to 300 kg/cm$^2$. The modulus at the activation temperature is therefore at the level of PSAs at room temperature. In this patent as well, in analogy to U.S. Pat. No. 4,248,748, the bond strength and the elasticity are controlled via the composition of the PSA. Furthermore, only double-sided heat-activatable PSA tapes are described, which can be activated by heat only on both sides.

The multiplicity of PSA tapes described illustrates the great demand which exists for such PSA tapes. It is desirable, however, to simplify further the construction of PSA tapes of this kind.

The object on which the invention is based is therefore that of specifying a pressure-sensitive adhesive which has an adhesive side and a nonadhesive side. The intention is also to specify a process for preparing a pressure-sensitive adhesive of this kind and also a use for a pressure-sensitive adhesive of this kind.

SUMMARY OF THE INVENTION

In accordance with the invention a pressure-sensitive adhesive is envisaged that comprises a first layer and a second layer, the first layer being a heat-activatable pressure-sensitive adhesive which has a static glass transition temperature $T_{g,a}$ or a melting point $T_{m,a}$ of at least +30° C.; and the second layer being a polyacrylate pressure-sensitive adhesive which has a static glass transition temperature of not more than +15° C.

Surprisingly it has been found that the pressure-sensitive adhesive of the invention meets the abovementioned requirements outstandingly. The pressure-sensitive adhesive of the invention is heat-activatable on one side, i.e., is nonadhesive at room temperature, and on the other side is tacky even at room temperature.

The pressure-sensitive adhesive of the invention is preferably a two-layer PSA.

In the text below, the first layer is referred to as layer A and the second layer as layer B.

BRIEF DESCRIPTION OF THE DRAWING

The drawing shows in diagrammatic representation a two-layer PSA of the invention, reference symbol 1 marking the first layer (layer (A)) and reference symbol 2 marking the second layer (layer (B)).

DETAILED DESCRIPTION

In one preferred embodiment of the PSA of the invention layers A and B are joined to one another by means of physical or chemical pretreatment of layer A.

Layer A

Layer A comprises a heat-activatable PSA which becomes tacky on exposure to heat and optional pressure and which, after bonding and cooling, solidifies to develop a high bond strength. Depending on the application temperature, these heat-activatable PSAs have different static glass transition temperatures $T_{g,a}$ or melting points $T_{m,a}$.

The heat-activatable PSAs may have different polymer structures. In one preferred embodiment thermoplastic heat-activatable materials are employed. Thermoplastics in this case—without this list having any claim to completeness—may be polyesters, copolyesters, polyamides, copolyamides, polyolefins, such as polyethylene, polypropylene, for example, polyethylvinyl acetate, polyurethanes or polymethacrylates.

In a further preferred embodiment heat-activatable PSAs are used which are composed of an elastomer and at least one reactive resin. Elastomers used in this case are preferably rubbers, including synthetic rubbers, polychloroisoprenes, polyacrylates, etc.

Examples of suitable reactive resins include phenolic resins, epoxy resins, melamine resins, resins containing isocyanate functions, or blends of the aforementioned resins. In combination with the reactive systems it is also possible to add a multiplicity of other resins, filler materials, catalysts, ageing inhibitors, etc. In addition it is also possible to combine reactive resins with thermoplastic elastomers as already specified above.

In a further preferred version heat-activatable PSAs based on poly(meth)acrylate are employed. The heat-activatable PSA of the first layer in this case comprises a polymer which comprises (a1) 70% to 100% by weight of acrylic esters and/or methacrylic esters and/or the free acids thereof with the formula $CH_2=C(R_1)(COOR_2)$, $R_1$ being H and/or $CH_3$ and $R_2$ being H and/or alkyl chains having 1 to 30 carbon atoms; and (a2) 0 to 30% by weight of olefinically unsaturated monomers containing functional groups;

the amounts by weight being based on the polymer.

For the monomers (a1) it is preferred to use acrylic monomers, encompassing acrylic and methacrylic esters with alkyl groups composed of 1 to 14 carbon atoms. Specific examples, without wishing to be restricted by this list, are methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and their branched isomers, such as 2-ethylhexyl acrylate, for example. Further classes of compound which can be used and which may likewise be added in small amounts under (a1) are cyclohexyl methacrylates, isobornyl acrylate and isobornyl methacrylates.

For (a2) it is preferred to use acrylic monomers corresponding to the following general formula

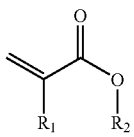

where $R_1$ is H and/or $CH_3$ and the radical $—OR_2$ denotes or comprises a functional group which supports subsequent UV crosslinking of the PSA and, for example, with particular preference possesses an H-donor action.

Particularly preferred examples of component (a2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide, and glyceridyl methacrylate, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylol-methacrylamide, N-(butoxymethyl)methacrylamide, N-methylolacrylamide, N-(ethoxy-methyl) acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, dimethylacrylic acid, this list not being conclusive.

For component (a2) preference is likewise given to using aromatic vinyl compounds, the aromatic nuclei being able to be composed preferably of $C_4$ to $C_{18}$ units and also to contain heteroatoms. Particularly preferred examples are styrene, 4-vinylpyridine, N-vinylphthalimide, methylstyrene, 3,4-dimethoxystyrene, 4-vinylbenzoic acid, this list not being conclusive.

For the polymerization the monomers are selected such that the resulting polymers can be used as heat-activatable PSAs, especially such that the resulting polymers possess pressure-sensitive adhesion properties in accordance with the "Handbook of Pressure Sensitive Adhesive Technology" by Donatas Satas (van Nostrand, New York 1989). For these applications the static glass transition temperature of the resulting polymer is advantageously above 30° C.

In order to obtain a polymer glass transition temperature $T_{g,a}$ of $T_{g,a} \geq 30°$ C., in accordance with the remarks above, the monomers are very preferably selected, and the quantitative composition of the monomer mixture advantageously selected, in such a way that in accordance with the Fox equation (E1) (cf. T. G. Fox, Bull. Am. Phys. Soc. 1 (1956) 123) the polymer develops the desired $T_{g,a}$.

$$\frac{1}{T_g} = \sum_n \frac{w_n}{T_{g,n}} \quad (E1)$$

In this equation n represents the serial number of the monomers employed, $w_n$ denotes the mass fraction of the respective monomer n (in percent by weight), and $T_{g,n}$ denotes the respective glass transition temperature of the homopolymer of each of the monomers n in K.

The various preparation processes (polymerization processes) for polyacrylate PSAs of this kind are described later on below.

For the anchoring of the heat-activatable polymers it may be of advantage if the polymer is corona-treated or plasma-treated prior to coating. Examples of apparatus suitable for atmospheric plasma treatment include those from the company Plasmatreat.

Moreover, for the operation and for the anchoring of the layer A to the layer B, it may be of advantage if chemical anchoring takes place by way, for example, of a primer. A polymer film may also contribute to improving the anchoring, based for example on polyester, polyamide, polymethacrylate, PVC, etc.

In a further preferred embodiment of the PSA tape of the invention polyolefins are used, especially poly-α-olefins, within the meaning of the layer A, that exhibit a softening range of greater than 30° C. and likewise solidify in the course of cooling after adhesive bonding. In one preferred embodiment the polyolefin-activatable PSAs have static glass transition temperatures $T_{g,a}$ or melting points $T_{m,a}$ of +35° C. to 180° C. The bond strength of these polymers can be increased by means of specific additization. Thus, for example, polyimine copolymers or polyvinyl acetate copolymers can be used as bond strength promoter additives.

In order to attain the desired static glass transition temperature $T_{g,a}$ or the melting point $T_{m,a}$ the monomers employed and also their amounts are preferably selected here as well in such a way that when the Fox equation (E1) is employed the desired temperature results.

Besides the monomer or comonomer composition for controlling the glass transition temperature it is possible to vary the molecular weight. In order to set a low static glass transition temperature $T_{g,a}$ or melting point $T_{m,a}$ use is made of polymers having an average or low molecular weight. The mixing of low molecular weight and high molecular weight polymers with one another is a further possibility. Particularly preferred embodiments use polyethenes, polypropenes, polybutenes, polyhexenes or copolymers of polyethene, polypropene, polybutene or polyhexene.

Under the trade name Vestoplast™ the company Degussa makes different heat-activatable poly-α-olefins available commercially. Propene-rich grades are offered under the identifications Vestoplast™ 703, 704, 708, 750, 751, 792, 828, 888 or 891. They possess melting points $T_{m,a}$ of 99 to 162° C. Also available commercially, furthermore, are butene-rich grades, under the identifications Vestoplast™ 308, 408, 508, 520 and 608. They possess melting points $T_{m,a}$ of 84 to 157° C.

Further examples of heat-activatable pressure-sensitive adhesives are described in patents U.S. Pat. No. 3,326,741, U.S. Pat. No. 3,639,500, U.S. Pat. No. 4,404,246, U.S. Pat. No. 4,452,955, U.S. Pat. No. 4,404,345, U.S. Pat. No. 4,545,843, U.S. Pat. No. 4,880,683 and U.S. Pat. No. 5,593,759. Reference is likewise made therein to further temperature-activatable PSAs.

Layer B

As layer B it is preferred to use a polyacrylate pressure-sensitive adhesive which comprises a polymer that in relation to the polymer comprises
(b1) 79% to 100% by weight of acrylic esters and/or methacrylic esters and/or the free acids thereof with the formula $CH_2=CH(R_3)(COOR_4)$, $R_3$ being H and/or $CH_3$ and $R_4$ being H and/or alkyl chains having 1 to 30 carbon atoms; and
(b2) 0 to 30% by weight of olefinically unsaturated monomers containing functional groups,
the amounts by weight being based on the polymer.

For the monomers (b1) it is preferred to use acrylic monomers which encompass acrylic and methacrylic esters with alkyl groups composed of 4 to 14 carbon atoms, preferably 4 to 9 carbon atoms. Specific examples, without wishing to be restricted by this list, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and their branched isomers, such as 2-ethylhexyl acrylate, for example. Further classes of compound which can be used and which may likewise be added in small amounts under (b1) are methyl methacrylates, cyclohexyl methacrylates, isobornyl acrylate and isobornyl methacrylates.

Relatively strong preference is given to using, for the monomers (b2), vinyl esters, vinyl ethers, vinyl halides, vinylidene halides, vinyl compounds with aromatic rings and heterocycles in α position. Here as well a number of nonlimiting examples may be given: vinyl acetate, vinylformamide, vinylpyridine, ethyl vinyl ether, vinyl chloride, vinylidene chloride, and acrylonitrile. Particular preference is given for the monomers (b2) to using monomers containing the following functional groups: hydroxyl, carboxyl, epoxy, acid amide, isocyanato or amino groups.

In one advantageous version acrylic monomers are used for (b2) that correspond to the following general formula

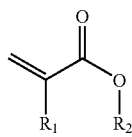

where $R_1$ is H or $CH_3$ and the radical $—OR_2$ denotes or comprises a functional group which supports subsequent UV crosslinking with the PSA and which with particular preference possesses, for example, an H-donor action.

Particularly preferred examples of component b2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide, and glyceridyl methacrylate, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylol-methacrylamide, N-(buthoxymethyl)methacrylamide, N-methylolacrylamide, N-(ethoxy-methyl)acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, dimethylacrylic acid, this list not being conclusive.

In a further preferred version use is made, for component (b2), of aromatic vinyl compounds, the aromatic nuclei being able to be composed preferably of $C_4$ to $C_{18}$ units and also to contain heteroatoms. Particularly preferred examples are styrene, 4-vinylpyridine, N-vinylphthalimide, methylstyrene, 3,4-dimethoxystyrene, 4-vinylbenzoic acid, this list not being conclusive.

For the polymerization the monomers are selected such that the resulting polymers can be used as industrially applicable PSAs, especially such that the resulting polymers possess pressure-sensitive adhesion properties in accordance with the "Handbook of Pressure Sensitive Adhesive Technology" by Donatas Satas (van Nostrand, New York 1989). Here as well the desired glass transition temperature can be controlled through the application of the Fox equation (E1) in connection with the make-up of the monomer mixture on which the polymerization is based. For the pressure-sensitive adhesive of layer B the static glass transition temperature of the resulting polymer is advantageously below 15° C.

Preparation of Layer B

To prepare the polyacrylate PSAs for layer B it is advantageous to carry out conventional free-radical polymerizations or controlled free-radical polymerizations. For the polymerizations which proceed by a radical mechanism it is preferred to use initiator systems which additionally comprise further free-radical initiators for the polymerization, especially thermally decomposing, free-radical-forming azo or peroxo initiators. In principle, however, any customary initiators that are familiar to the skilled worker for acrylates are suitable. The production of C-centered free radicals is described in Houben-Weyl, Methoden der Organischen Chemie, Vol. E 19a, pp. 60-147. These methods are employed preferentially in analogy.

Examples of free-radical sources are peroxides, hydroperoxides, and azo compounds. Some nonexclusive examples of typical free-radical initiators that may be mentioned here include potassium peroxodisulfate, dibenzoyl peroxide, cumene hydroperoxide, cyclohexanone peroxide, di-tert-butyl peroxide, azodiisobutyronitrile, cyclohexylsulfonyl acetyl peroxide, diisopropyl percarbonate, tert-butyl peroctoate, and benzpinacol. Particular preference is given to using, as a free-radical initiator, 1,1'-azobis(cyclohexanecarbonitrile) (Vazo 88™ from DuPont).

The average molecular weights $M_n$ of the PSAs formed in the course of the free-radical polymerization are very preferably selected such as to be situated within a range from 20000 to 2000000 g/mol; specifically for further use as hotmelt PSAs, PSAs having average molecular weights $M_n$ of 100000 to 500000 g/mol are prepared. The average molecular weight is determined by way of size exclusion chromatography (SEC) or matrix-assisted laser desorption/ionization coupled with mass spectrometry (MALDI-MS).

The polymerization can be conducted in bulk (without solvent), in the presence of one or more organic solvents, in the presence of water or in mixtures of organic solvents and water. The aim is to minimize the amount of solvent used. Suitable organic solvents include straight alkanes (e.g. hexane, heptane, octane or isooctane), aromatic hydrocarbons (e.g. benzene, toluene or xylene), esters (e.g. ethyl, propyl, butyl or hexyl acetate), halogenated hydrocarbons (e.g. chlorobenzene), alkanols (e.g. methanol, ethanol, ethylene glycol and ethylene glycol monomethyl ether) and ethers (e.g. diethyl ether and dibutyl ether) or mixtures thereof. The aqueous polymerization reactions can be admixed with a water-miscible or hydrophilic cosolvent so as to ensure that the reaction mixture is in the form of a homogeneous phase during monomer conversion. Cosolvents which can be used with advantage for the present invention are selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxyether derivatives, amino alcohols, ketones and the like, and also derivatives and mixtures of these.

Depending on conversion and temperature, the polymerization time is between 4 and 72 hours. The higher the level at which it is possible to select the reaction temperature, in other words the higher the thermal stability of the reaction mixture, the lower the reaction time that can be selected.

For the thermally decomposing initiators the introduction of heat is essential to initiate the polymerization. For the thermally decomposing initiators the polymerization can be initiated by heating to from 50 to 160° C., depending on initiator type.

For radical stabilization an advantageous procedure is to use nitroxides of type (NIT 1) or (NIT 2):

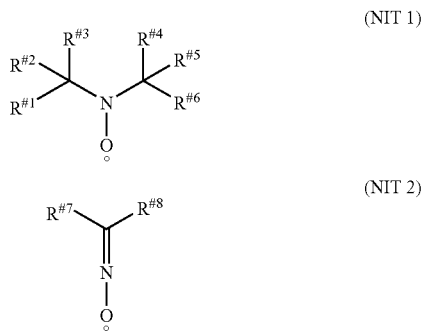

where $R^{\#1}$, $R^{\#2}$, $R^{\#3}$, $R^{\#4}$, $R^{\#5}$, $R^{\#6}$, $R^{\#7}$ and $R^{\#8}$ independently of one another denote the following compounds or atoms:
i) halides, such as chlorine, bromine or iodine, for example;
ii) linear, branched, cyclic and heterocyclic hydrocarbons having 1 to 20 carbon atoms, which may be saturated, unsaturated or aromatic;
iii) esters —$COOR^{\#9}$, alkoxides —$OR^{\#10}$ and/or phosphonates —$PO(OR^{\#11})_2$, where $R^{\#9}$, $R^{\#10}$ and/or $R^{\#11}$ stand for radicals from group ii).

Compounds of structure (NIT 1) or (NIT 2) can also be attached to polymer chains of any kind (primarily such that at least one of the abovementioned radicals constitutes such a polymer chain) and can therefore be used to synthesize the block copolymers, as macroradicals or macroregulators.

Greater preference for the polymerization of compounds is given to controlled regulators of the following type:
2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxyl pyrrolidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl 1-phenyl-2-methylpropyl nitroxide
N-tert-butyl 1-(2-naphthyl)-2-methylpropyl nitroxide
N-tert-butyl 1-diethylphosphono-2,2-dimethylpropyl nitroxide
N-tert-butyl 1-dibenzylphosphono-2,2-dimethylpropyl nitroxide
N-(1-phenyl-2-methylpropyl) 1-diethylphosphono-1-methylethyl nitroxide
di-t-butyl nitroxide
diphenyl nitroxide
t-butyl t-amyl nitroxide.

A range of further polymerization methods by which the laminating adhesives can be prepared in an alternative procedure can be selected from the prior art:

U.S. Pat. No. 4,581,429 A discloses a controlled-growth radical polymerization process initiated using a compound of the formula R'R"N—O—Y in which Y is a free radical species which is able to polymerize unsaturated monomers. The reactions, however, generally have low conversions. A particular problem is the polymerization of acrylates, which proceeds only to very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process using very specific radical compounds such as, for example, phosphorus-containing nitroxides which are based on imidazolidine. WO 98/44008 A1 discloses specific nitroxyls based on morpholines, piperazinones and piperazinediones. DE 199 49 352 A1 describes heterocyclic alkoxyamines as regulators in controlled-growth radical polymerizations. Corresponding further developments of the alkoxyamines or of the corresponding free nitroxides enhance the efficiency for preparing polyacrylates (Hawker, contribution to the National Meeting of the American Chemical Society, Spring 1997; Husemann, contribution to the IUPAC World-Polymer Meeting 1998, Gold Coast).

As a further controlled polymerization method it is possible advantageously to use atom transfer radical polymerization (ATRP) to synthesize block copolymers, with preferably monofunctional or difunctional secondary or tertiary halides being used as initiators and, to abstract the halide(s), complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The different possibilities of ATRP are further described in U.S. Pat. Nos. 5,945,491, 5,854,364 and 5,789,487.

It is also possible with advantage to prepare the polymer used in accordance with the invention by way of an anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, where Me is a metal from group I of the Periodic Table, such as lithium, sodium or potassium, and $P_L(A)$ is a growing polymer block of the monomers A. The molar mass of the polymer under preparation is determined by the ratio of initiator concentration to monomer concentration. Examples of suitable polymerization initiators include n-propyllithium, n-butyllithium, sec-butyllithium, 2-naphthyllithium, cyclohexyllithium and octyllithium, though this enumeration makes no claim to completeness. Initiators based on samarium complexes are also known for the polymerization of acrylates (Macromolecules, 1995, 28, 7886) and can be used here.

It is also possible, moreover, to use difunctional initiators, such as 1,1,4,4-tetraphenyl-1,4-dilithiobutane or 1,1,4,4-tetraphenyl-1,4-dilithioisobutane, for example. Coinitiators may likewise be employed. Suitable coinitiators include lithium halides, alkali metal alkoxides and alkylaluminum compounds. In one very preferred version the ligands and coinitiators are chosen so that acrylate monomers, such as n-butyl acrylate and 2-ethylhexyl acrylate, for example, can be polymerized directly and do not have to be generated in the polymer by transesterification with the corresponding alcohol.

A very preferred preparation process conducted is a version of RAFT polymerization (reversible addition-fragmentation chain transfer polymerization). The polymerization process is described in detail in, for example, WO 98/01478 A1 and WO 99/31144 A1. Suitable with particular advantage for the preparation are trithiocarbonates of the general structure R'''-S—C(S)—S—R''' (Macromolecules 2000, 33, 243-245).

In one very advantageous version, for example, the trithiocarbonates (TTC1) and (TTC2) or the thio compounds (THI1) and (THI2) are used for the polymerization, in which ☐ can be a phenyl ring, which can be unfunctionalized or functionalized by alkyl or aryl substituents attached directly or via ester or ether bridges, or can be a cyano group, or can be a saturated or unsaturated aliphatic radical. The phenyl ring ☐ may optionally bear one or more polymer blocks, examples being polybutadiene, polyisoprene, poly-chloroprene or poly (meth)acrylate, which may have been synthesized in accordance with the definition for P(A) or P(B), or may carry polystyrene, to name but a few. Examples of possible functionalizations include halogens, hydroxyl groups, epoxide groups, and groups containing nitrogen or containing sulfur, without this list making any claim to completeness.

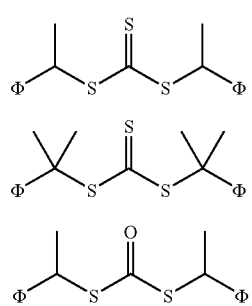

(TTC 1)

(TTC 2)

(THI 1)

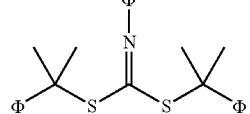

(THI 2)

It is additionally possible to employ thioesters of the general structure $$R^{S1}—C(S)—S—R^{S2} \quad (THE),$$

particularly in order to prepare asymmetric systems. $R^{S1}$ and $R^{S2}$ may be selected independently of one another and $R^{S1}$ can be a radical from one of groups i) to iv) below, and $R^{S2}$ a radical from one of groups i) to iii) below:

i) $C_1$ to $C_{18}$ alkyl, $C_2$ to $C_{18}$ alkenyl, $C_2$ to $C_{18}$ alkynyl, each linear or branched; aryl, phenyl, benzyl, aliphatic and aromatic heterocycles;

ii) $—NH_2$, $—NH—R^{S3}$, $—NR^{S3}R^{S4}$, $—NH—C(O)—R^{S3}$, $—NR^{S3}—C(O)—R^{S4}$, $—NH—C(S)—R^{S3}$, $—NR^{S3}—C(S)—R^{S4}$,

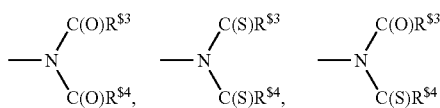

where $R^{S3}$ and $R^{S4}$ are radicals selected independently of one another from group i);

iii) $—S—R^{S5}$ or $—S—C(S)—R^{S5}$, where $R^{S5}$ can be a radical from one of groups i) and ii);

iv) $—O—R^{S6}$ or $—O—C(O)—R^{S6}$, where $R^{S6}$ can be a radical from one of groups i) and ii).

In connection with the abovementioned controlled-growth free-radical polymerizations preferred initiator systems are those additionally comprising further free-radical initiators for the polymerization, especially thermally decomposing radical-forming azo or peroxo initiators. In principle, however, all customary initiators known for acrylates are suitable for this purpose. The production of C-centered radicals is described in Houben-Weyl, Methoden der Organischen Chemie, Vol. E19a, p. 60 ff. These methods are employed preferentially. Examples of radical sources are peroxides, hydroperoxides and azo compounds. As a number of nonexclusive examples of typical radical initiators mention may be made here of the following: potassium peroxodisulfate, dibenzoyl peroxide, cumene hydroperoxide, cyclohexanone peroxide, cyclohexylsulfonyl acetyl peroxide, di-tert-butyl peroxide, azodiisobutyronitrile, diisopropyl percarbonate, tert-butyl peroctoate and benzpinacol. In one very preferred version the free-radical initiator used is 1,1'-azobis(cyclohexylnitrile) (Vazo 88®, DuPont®) or 2,2-azobis(2-methylbutanenitrile) (Vazo 67®, DuPont®). It is also possible, furthermore, to use radical sources which release radicals only under UV irradiation.

In the conventional RAFT process polymerization is conducted usually only to low conversions (WO 98/01478 A1) in order to realize molecular weight distributions which are as narrow as possible. As a result of the low conversions, however, these polymers cannot be used as PSAs and in particular not as hotmelt PSAs, since the high residual monomer content impacts negatively on the technical adhesive properties, the residual monomers contaminate the solvent recyclate in the concentration process, and the corresponding self-adhesive tapes would exhibit a very high level of outgassing.

For the purpose of advantageous further development it is possible to add resins to the PSAs of layer B. As tackifying resins to be added it is possible without exception to use all existing tackifier resins described in the literature. Mention may be made, as representatives, of pinene resins, indene resins and rosins, their disproportionated, hydrogenated, polymerized and esterified derivatives and salts, aliphatic and aromatic hydrocarbon resins, terpene resins and terpene-phenolic resins, and also C5, C9 and other hydrocarbon resins. Any desired combinations of these and other resins may be employed in order to adjust the properties of the resultant adhesive in accordance with what is desired. Generally speaking it is possible to use any resins which are compatible (soluble) with the corresponding polyacrylate; reference may be made in particular to all aliphatic, aromatic and alkylaromatic hydrocarbon resins, hydrocarbon resins based on single monomers, hydrogenated hydrocarbon resins, functional hydrocarbon resins and natural resins. Express reference is made to the depiction of the state of the art in "Handbook of Pressure Sensitive Adhesive Technology" by Donatas Satas (van Nostrand, 1989).

A further possibility, as an option, is to add plasticizers, fillers (e.g. fibers, carbon black, zinc oxide, titanium dioxide, chalk, solid or hollow glass beads, microbeads made from other materials, silica, silicates), nucleators, expandants, compounding agents and/or ageing inhibitors, in the form for example of primary and secondary antioxidants or in the form of light stabilizers.

The internal strength (cohesion) of the PSA is preferably raised by crosslinking. For this purpose it is possible as an option to add compatible crosslinker substances to the acrylate PSAs. Examples of suitable crosslinkers include metal chelates, polyfunctional isocyanates, polyfunctional amines and polyfunctional alcohols. Polyfunctional acrylates as well can be used with advantage as crosslinkers for actinic irradiation.

Process for Preparation of the PSA of the Invention

The PSAs of layer B can be applied from solution to the heat-activatable layer A or from the melt. For coating from solution it is preferred to use solvents which do not dissolve the layer A. For application from the melt the solvent is preferably stripped off under reduced pressure in a concentrating extruder, for which purpose it is possible, for example, to use single-screw or twin-screw extruders which preferably distill off the solvent in different or the same vacuum stages and which possess a feed preheater.

In one further, very preferred process the layers A and B are brought together in a coextrusion process simultaneously with a coextrusion die.

After the coating operation the acrylate PSAs are preferably crosslinked on a carrier.

For optional crosslinking with UV light UV-absorbing photoinitiators are added to the acrylate PSAs. Useful photoinitiators which can be used to very good effect are benzoin ethers, such as benzoin methyl ether and benzoin isopropyl ether, substituted acetophenones, such as 2,2-diethoxyacetophenone (available as Irgacure 651® from Ciba Geigy®), 2,2-dimethoxy-2-phenyl-1-phenylethanone and dimethoxyhydroxy-acetophenone, substituted □-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime, for example.

The abovementioned and further photoinitiators which can be used, and others of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenylmorpholine ketone, aminoketone, azobenzoin, thioxanthone, hexaarylbisimidazole, triazine, or fluorenone radicals, it being possible for each of these radicals additionally to be substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. Further details may be obtained by consulting Carroy et al. in "Chemistry and Technology of UV and EB Formulation for Coatings, Inks and Paints", Oldring (ed.), 1994, SITA, London.

In principle it is also possible to crosslink the acrylate PSAs using electron beams. Typical irradiation apparatus which may be employed includes linear cathode systems, scanner systems, and segmented cathode systems where the apparatus in question comprises electron beam accelerators. A detailed description of the state of the art and the most important process parameters can be found in Skelhorne, Electron Beam Processing, in Chemistry and Technology of UV and EB formulation for Coatings, Inks and Paints, Vol. 1, 1991, SITA, London. The typical acceleration voltages are situated in the range between 50 kV and 500 kV, preferably between 80 kV and 300 kV. The scatter doses employed range between 5 to 150 kGy, in particular between 20 and 100 kGy.

The invention further provides for the use of the pressure-sensitive adhesives of the invention for pressure-sensitive adhesive tapes.

EXAMPLES

Heat-Activatable PSA (Layer A)

The heat-activatable pressure-sensitive adhesive was prepared using the commercial polyethylene/butylene copolymer Vestoplast® 408 or the copolyamide Platamid® 1276 from Atofina. The respective copolymer was coated from the melt at a rate of 50 g/m² through a coating nozzle onto a release paper with a 1.6 g/m² application of silicone.

Characteristic properties reported by the manufacturer for the Vestoplast® copolymer used are listed in Table 1:

TABLE 1

| Mechanical, thermal, calorific properties | Measurement method | Unit | Value |
| --- | --- | --- | --- |
| Melt viscosity at 190° C. | method based on DIN 53 019 | mPa□s | 8000 ± 2000 |
| Softening point (r & b) | method based on DIN 52 011 | ° C. | 118 ± 4 |
| Needle penetration (100/25/5) | method based on DIN 52 010 | 0.1 mm | 5 ± 2 |
| Thermal stability | Degussa method based on WPS 68 (5° C./h, weight 450 g) | ° C. | 85-90 |
| Tensile strength | method based on DIN 53 455 | N/mm² | 6.8 |
| Breaking extension | Stab. 4 | % | 80 |

TABLE 1-continued

| Mechanical, thermal, calorific properties | Measurement method | Unit | Value |
|---|---|---|---|
| Shear modulus at 23° C. | DIN 53 455 | N/mm$^2$ | 70 |
| Molar mass $M_n$ | GPC based on DIN 55 672 | g/mol | 11 600 |
| Molar mass weight-average molecular weight | GPC based on DIN 55 672 | | 48 000 |
| Open time | Degussa method QS-AA-MAT 3-05 | s or min | 65 s |
| Setting time | Degussa method QS-AA-MAT 3-29 | s | 1 |
| Glass transition temperature | DSC-analysis based on DIN 53 765 Degussa method AN-SAA-0663 | ° C. | −27 |
| Density at 23° C. | DIN 53 479 | g/cm$^3$ | 0.9 |
| Shore hardness A | DIN 53 505 | — | 94 |

Preparation of the Polyacrylates (Layer B)

Polyacrylate 1

A 2-l-glass reactor conventional for free-radical polymerizations was charged with 40 g of acrylic acid, 360 g of 2-ethylhexyl acrylate and 133 g of acetone/isopropanol (96:4). After nitrogen gas had been passed through the reactor for 45 minutes with stirring the reactor was heated to 58° C. and 0.2 g of azoisobutyronitrile (AIBN, Vazo 64™, DuPont) was added. Subsequently the external heating bath was heated to 75° C. and the reaction was carried out constantly at this external temperature. After a reaction time of 1 h a further 0.2 g of AIBN was added. After 4 h and 8 h 100 g portions of acetone/isopropanol (96:4) were used to dilute the mixture. Residual initiators were reduced by adding, after 8 h and after 10 h, portions of 0.6 g of bis(4-tert-butylcyclohexanyl) peroxydicarbonate (Perkadox 16™, Akzo Nobel). The reaction was discontinued after a time of 24 h and the mixture was cooled to room temperature.

The polyacrylate was subsequently blended with 0.4% by weight of aluminum(III) acetylacetonate (3% strength solution in isopropanol), diluted to a solids content of 30% with isopropanol, and then coated from solution onto the heat-activatable layer A. After drying at 90° C. for 20 minutes the application rate was 50 g/m$^2$.

Polyacrylate 2

A 2-l-glass reactor conventional for free-radical polymerizations was charged with 28 g of acrylic acid, 80 g of methyl acrylate, 292 g of 2-ethylhexyl acrylate and 200 g of acetone/isopropanol (95:5). After nitrogen gas had been passed through the reactor for 45 minutes with stirring the reactor was heated to 58° C. and 0.2 g of azoisobutyronitrile (AIBN, Vazo 64™, DuPont) was added. Subsequently the external heating bath was heated to 75° C. and the reaction was carried out constantly at this external temperature. After a reaction time of 1 h a further 0.2 g of AIBN was added. After 4 h and 8 h 100 g portions of acetone/isopropanol (95:5) were used to dilute the mixture. Residual initiators were reduced by adding, after 8 h and after 10 h, portions of 0.6 g of bis(4-tert-butylcyclohexanyl) peroxydicarbonate (Perkadox 16™, Akzo Nobel). The reaction was discontinued after a time of 24 h and the mixture was cooled to room temperature. Subsequently the polyacrylate was freed from the solvent in a vacuum drying cabinet at 95° C. and 1 torr and was coated from the melt at a temperature of 160° C. in the melt curtain onto the heat-activatable layer A. Crosslinking was carried out with electron beams, using an instrument from the company Electron Crosslinking AB, Halmstad, Sweden. The pressure-sensitive adhesive assembly, during this operation, was passed through beneath the Lenard window of the accelerator, via a chill roll which is present as standard. In the zone of irradiation the atmospheric oxygen was displaced by flushing with pure nitrogen. The web speed was 10 m/min in each case. Irradiation was carried out at 60 kilograys and an acceleration voltage of 200 kV.

Described below are four examples of two-layer PSAs of the invention. The PSAs prepared were always processed in the way described above.

Example 1

Layer A: copolymer Vestoplast® 408
Layer B: polyacrylate 1

Example 2

Layer A: copolymer Vestoplast®408
Layer B: polyacrylate 2

Example 3

Layer A: copolyamide Platamid® 1276
Layer B: polyacrylate 1

Example 4

Layer A: copolyamide Platamid® 1276
Layer B: polyacrylate 2

The examples listed can be used for bonding adherends or any substrates or materials. For the purpose of initial fixing, examples 1 to 4 possess pressure-sensitive tack properties. Subsequently, by heating with subsequent cooling, the composite strength can be significantly increased. With particular preference, for example, examples 1 and 2 are used to bond olefinic substrates with the Vestoplast side and polar substrates, such as steel or polyester, for example, with the polyacrylate side. In this way it is possible with the examples according to the invention to join together substrates whose polarity is very different.

LIST OF REFERENCE SYMBOLS USED

1 Layer of heat-activatable pressure-sensitive adhesive (layer A)
2 Layer of polyacrylate pressure-sensitive adhesive (layer B)

The invention claimed is:
1. A two-layer pressure-sensitive adhesive having only a first pressure sensitive adhesive layer joined to a second pres- sure-sensitive adhesive layer, wherein said first and second layers are in contact with each other, said first and second pressure sensitive adhesive layers optionally being joined to one another by means of physical or chemical pretreatment of said first pressure sensitive adhesive layer;

the first pressure sensitive adhesive layer being a heat-activatable pressure-sensitive adhesive which has a static glass transition temperature $T_{g,a}$ or a melting point $T_{m,a}$ of at least +30° C.; and the second pressure sensitive adhesive layer being a polyacrylate pressure-sensitive adhesive which has a static glass transition temperature of not more than +15° C.

2. The pressure-sensitive adhesive of claim 1, wherein the heat-activatable pressure-sensitive adhesive of the first layer is a thermoplastic polymer.

3. The pressure-sensitive adhesive of claim 1 wherein the heat-activatable pressure-sensitive adhesive of the first layer is selected from the group consisting of polyesters, copolyesters, polyamides, copolyamides, polyolefins, polyurethanes and polymethacrylates.

4. The pressure-sensitive adhesive of claim 1, wherein the heat-activatable pressure-sensitive adhesive of the first layer comprises an elastomer and at least one reactive resin.

5. The pressure-sensitive adhesive of claim 1, wherein the heat-activatable pressure-sensitive adhesive of the first layer comprises a polymer which in relation to the polymer weight comprises (a1)) 70% to 100% by weight of acrylic esters, methacrylic esters, the free acids of said acrylic esters and methacrylic esters, with the formula $CH_2=C(R_1)(COOR_2)$, $R_1$ being H or $CH_3$ and $R_2$ being H or alkyl chains having 1 to 30 carbon atoms, and combinations of said acrylic esters, methacrylic esters, and their acids; and (a2) 0 to 30% by weight of olefinically unsaturated monomers containing functional groups.

6. The pressure-sensitive adhesive of claim 1, wherein the polyacrylate pressure-sensitive adhesive of the second layer comprises a polymer which in relation to the polymer weight comprises (b1) 79% to 100% by weight of acrylic esters, methacrylic esters, the free acids of said acrylic esters and methacrylic esters, with the formula $CH_2=C(R_3)(COOR_4)$, $R_3$ being H and/or $CH_3$ and $R_4$ being H and/or alkyl chains having 1 to 30 carbon atoms, and combinations of said acrylic esters, methacrylic esters and their acids; and (b2) 0 to 30% by weight of olefinically unsaturated monomers containing functional groups.

7. A process for preparing the pressure-sensitive adhesive of claim 1, which comprises applying the heat-activatable pressure-sensitive adhesive of the first layer from solution to the polyacrylate pressure-sensitive adhesive of the second layer.

8. A process for preparing the pressure-sensitive adhesive of claim 1, which comprises applying the heat-activatable pressure-sensitive adhesive of the first layer from the melt to the polyacrylate pressure-sensitive adhesive of the second layer.

9. A process for preparing the pressure-sensitive adhesive of claim 1, which comprises bringing together the heat-activatable pressure-sensitive adhesive of the first layer and the polyacrylate pressure-sensitive adhesive of the second layer by coextrusion.

10. The process of claim 7, further comprising the step of crosslinking the polyacrylate pressure-sensitive adhesive of the second layer or the polyacrylate pressure-sensitive adhesives of both the first and second layers.

11. A pressure-sensitive adhesive tape comprising the pressure-sensitive adhesive of claim 1.

12. The process of claim 8, further comprising the step of crosslinking the polyacrylate pressure-sensitive adhesive of the second layer or the polyacrylate pressure-sensitive adhesives of both the first and second layers.

13. The process of claim 9, further comprising the step of crosslinking the polyacrylate pressure-sensitive adhesive of the second layer or the polyacrylate pressure-sensitive adhesives of both the first and second layers.

* * * * *